US012789424B2

(12) United States Patent
Kagawa

(10) Patent No.: US 12,789,424 B2
(45) Date of Patent: Nov. 10, 2026

(54) MOLDED BODY MANUFACTURING METHOD

(71) Applicant: MICRO-AMS INC., Kanagawa (JP)

(72) Inventor: Shingo Kagawa, Kanagawa (JP)

(73) Assignee: MICRO-AMS INC. (JP)

( * ) Notice: Subject to any disclaimer, the term of this patent is extended or adjusted under 35 U.S.C. 154(b) by 24 days.

(21) Appl. No.: 18/274,424

(22) PCT Filed: Jan. 11, 2022

(86) PCT No.: PCT/JP2022/000529
§ 371 (c)(1),
(2) Date: Jul. 26, 2023

(87) PCT Pub. No.: WO2022/163339
PCT Pub. Date: Aug. 4, 2022

(65) Prior Publication Data
US 2024/0075662 A1 Mar. 7, 2024

(30) Foreign Application Priority Data
Jan. 28, 2021 (JP) ................................ 2021-012024

(51) Int. Cl.
*B29C 43/52* (2006.01)
*B29C 33/08* (2006.01)
(Continued)

(52) U.S. Cl.
CPC .............. *B29C 43/52* (2013.01); *B29C 33/08* (2013.01); *B29K 2101/10* (2013.01); *B29K 2101/12* (2013.01)

(58) Field of Classification Search
CPC .. B29C 43/52; B29C 33/08; B29C 2035/0855
See application file for complete search history.

(56) References Cited

U.S. PATENT DOCUMENTS 6,984,352 B1 * 1/2006 Akopyan ............ B29C 33/3828 425/174.8 E
2004/0222554 A1 * 11/2004 Akopyan ................ B29C 45/74 264/220

(Continued)

FOREIGN PATENT DOCUMENTS

JP 2013119219 A 6/2013
JP 2013520335 A 6/2013

(Continued)

OTHER PUBLICATIONS

International Search Report of the ISA issued in PCT/JP2022/000529 mailed on Feb. 22, 2022, ISA/JP (11 pages).

(Continued)

*Primary Examiner* — Michael A Tolin
*Assistant Examiner* — Hana C Page
(74) *Attorney, Agent, or Firm* — Harness, Dickey & Pierce, P.L.C.

(57) ABSTRACT

In a molded body manufacturing method, after a raw material is put into a cavity of a mold, at least a part of the mold is irradiated with electromagnetic waves, or at least part of the mold is placed in an alternating electric field, to mold a molded body. The mold has a heating body, which absorbs the electromagnetic waves to generate heat or is placed in the alternating electric field to generate heat, outside the cavity. In at least part of a space between the heating body and the cavity, a transmission amount suppressing body that suppresses the amount of transmission of the electromagnetic waves or the alternating electric field into the cavity is provided, or at least part of the cavity is composed of the transmission amount suppressing body. When the heating body generates heat, the heat is transmitted to the raw material to perform molding.

8 Claims, 18 Drawing Sheets

(51) Int. Cl.

| | |
|---|---|
| *B29K 101/10* | (2006.01) |
| *B29K 101/12* | (2006.01) |

(56) References Cited

U.S. PATENT DOCUMENTS

| | | | | |
|---|---|---|---|---|
| 2013/0075956 | A1 | 3/2013 | Waeckerle | |
| 2013/0285292 | A1* | 10/2013 | Sanderson | B29C 43/52 425/89 |
| 2014/0225314 | A1* | 8/2014 | Kurihara | B29C 35/02 264/479 |
| 2020/0107609 | A1* | 4/2020 | Ahn | A43B 13/181 |
| 2020/0215726 | A1 | 7/2020 | Haibach et al. | |
| 2022/0168989 | A1 | 6/2022 | Kikuchi et al. | |
| 2022/0169774 | A1 | 6/2022 | Oda et al. | |

FOREIGN PATENT DOCUMENTS

| | | | |
|---|---|---|---|
| JP | 2018114723 | A | 7/2018 |
| JP | 2019192724 | A | 10/2019 |
| WO | 2012173053 | A1 | 12/2012 |
| WO | 2020189268 | A1 | 9/2020 |
| WO | 2020203472 | A1 | 10/2020 |

OTHER PUBLICATIONS

Extended European Search Report issued in corresponding EP application 22745564.9, dated Nov. 5, 2024 (28 pages).

Japanese Office Action issued in counterpart Japanese patent application 2021-012024 on Jul. 2, 2024 (16 pages).

* cited by examiner

[FIG 1]
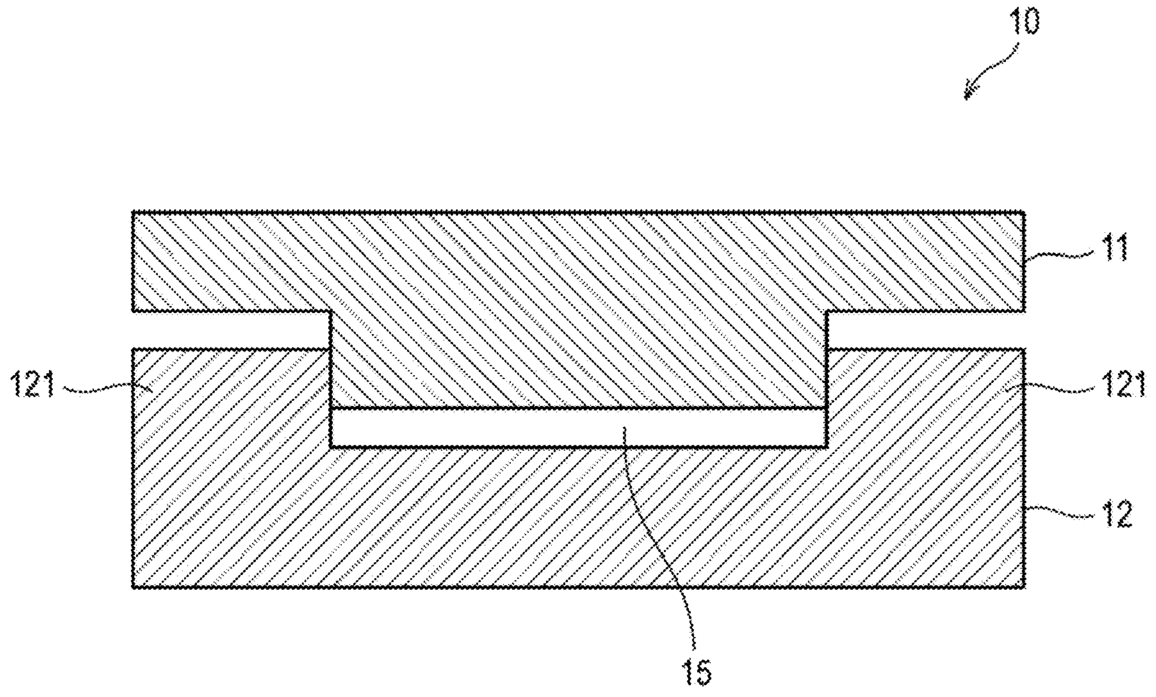

[FIG 2]
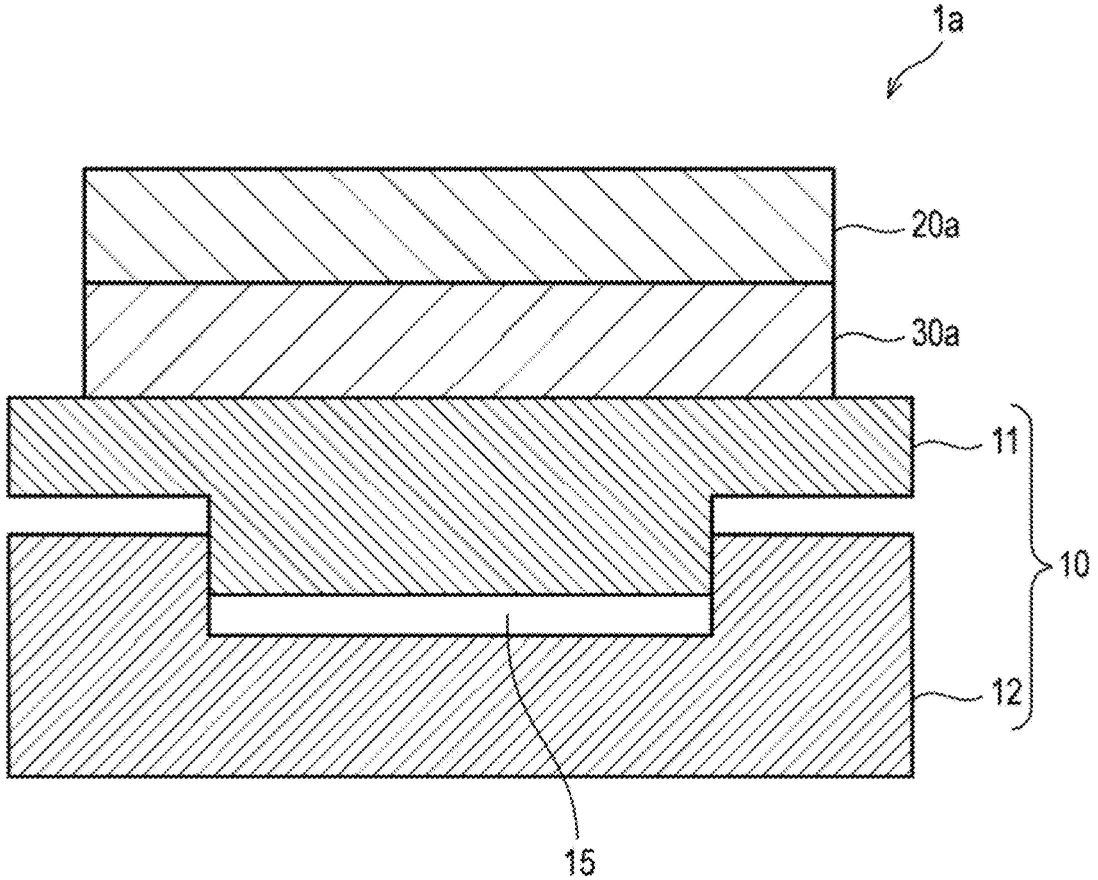

[FIG 3]
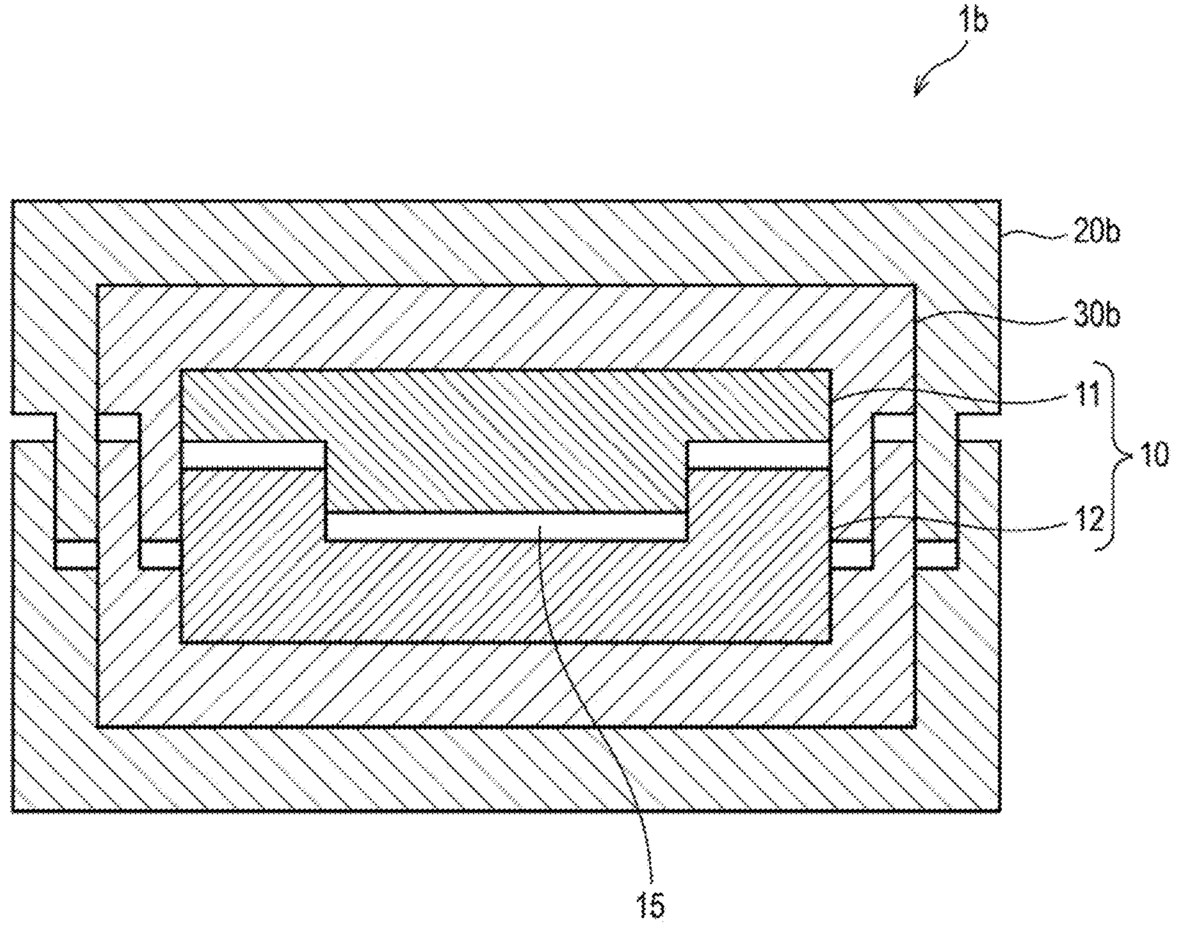

[FIG 4]
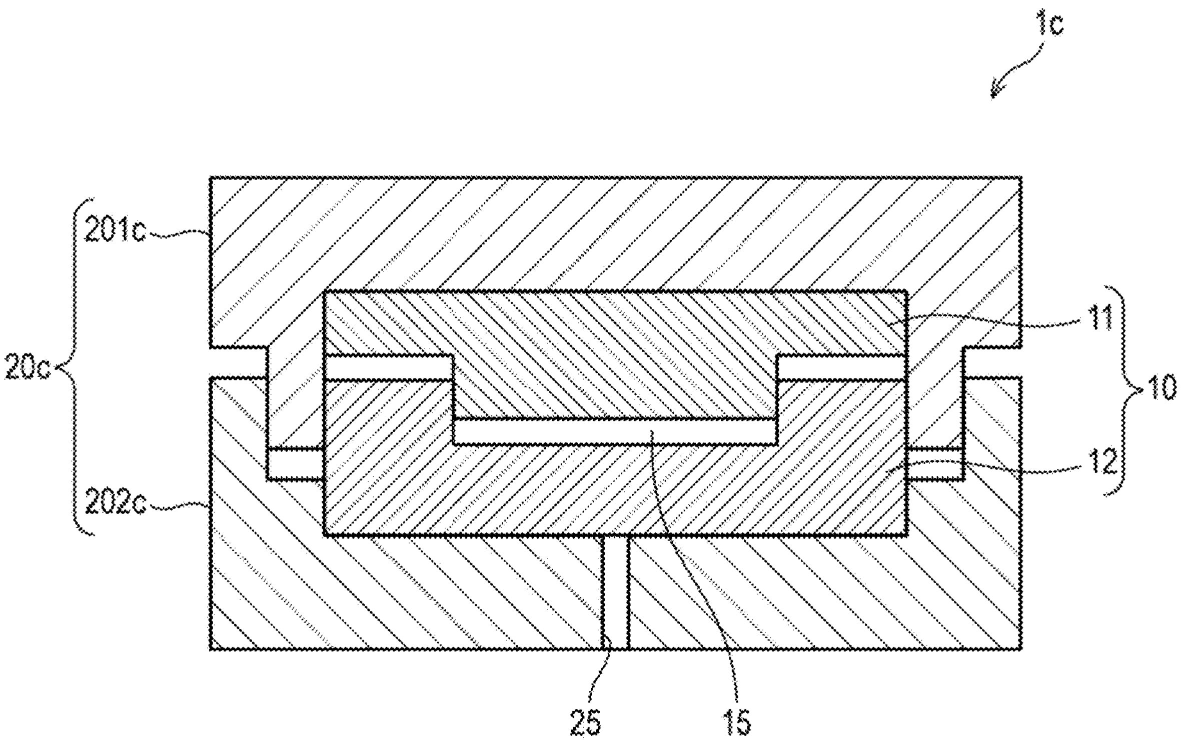

[FIG 5]
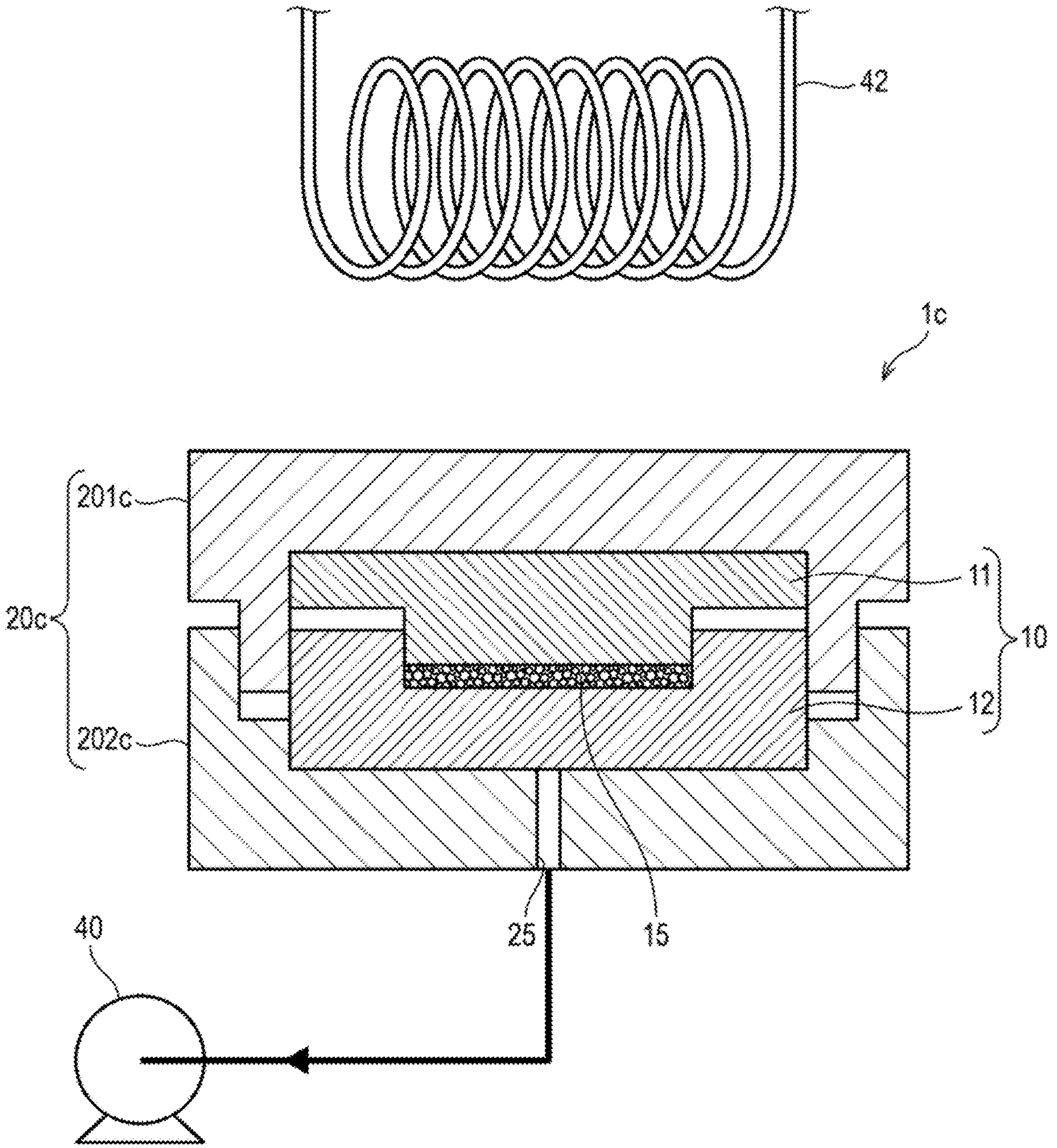

[FIG 6]
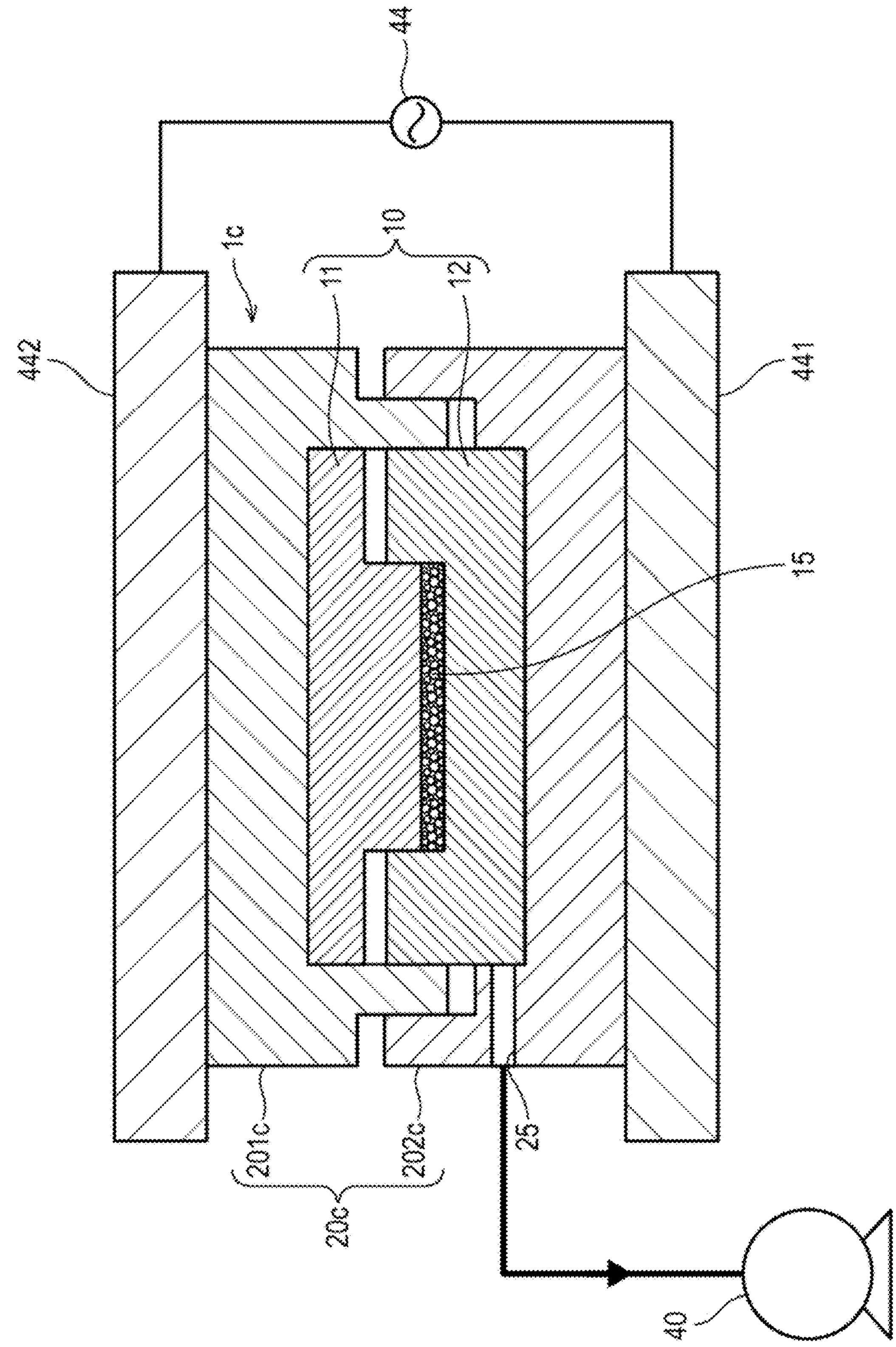

[FIG 7]
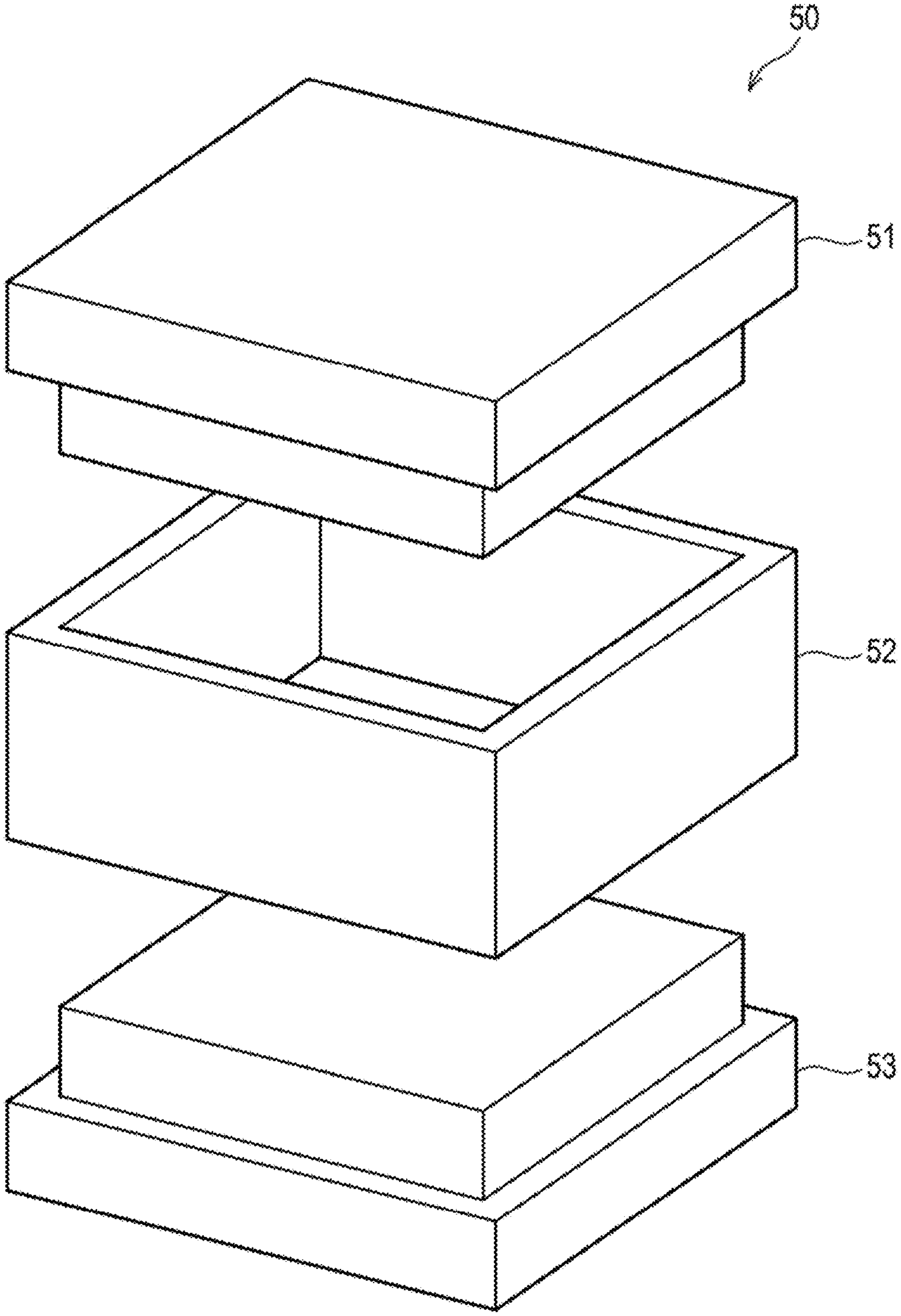

[FIG 8]
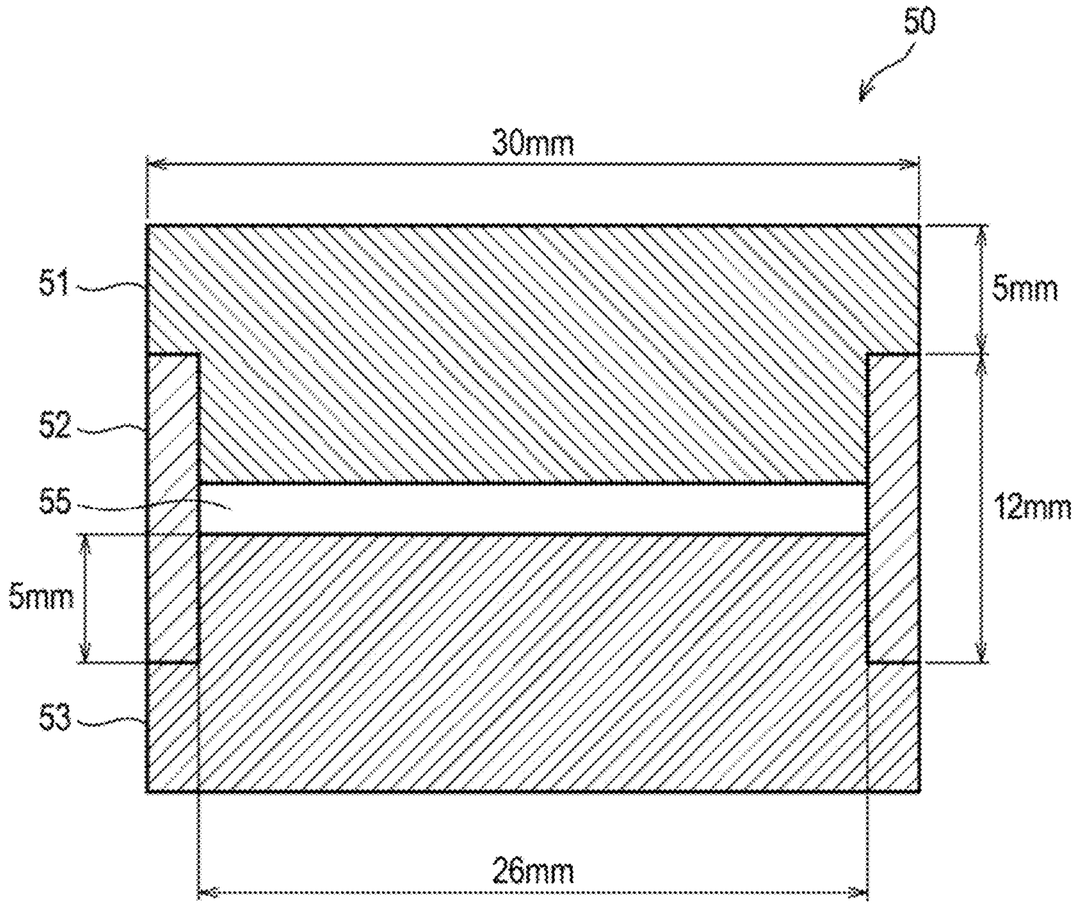

[FIG 9]
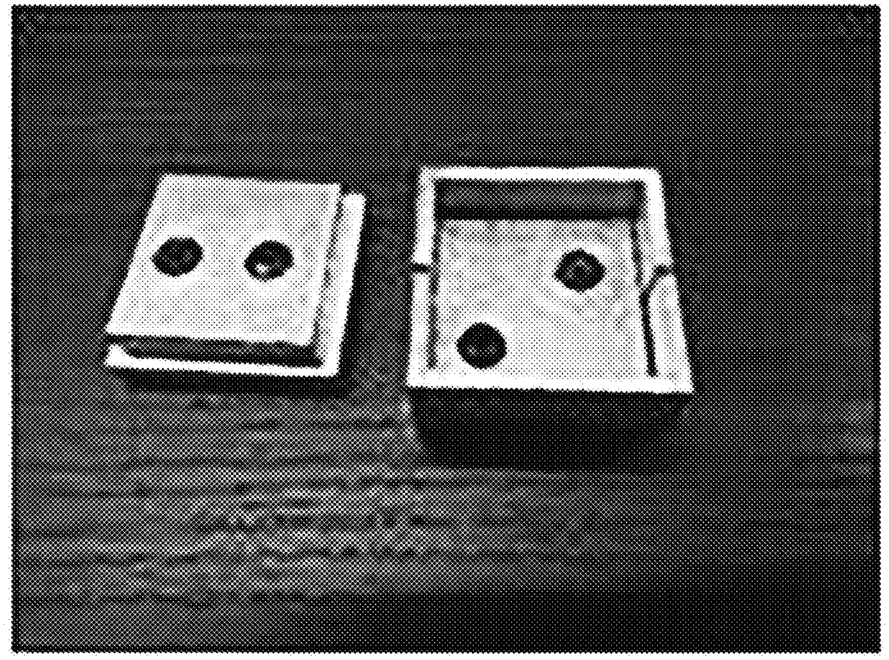

[FIG 10]
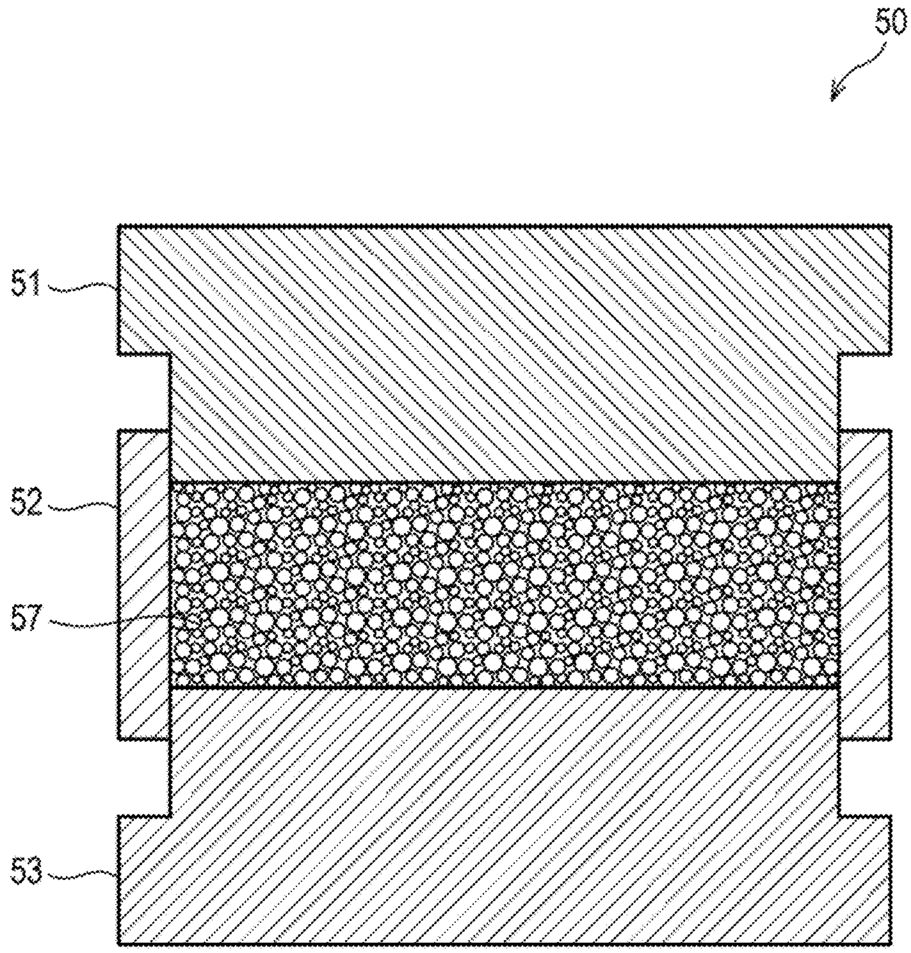

[FIG 11]
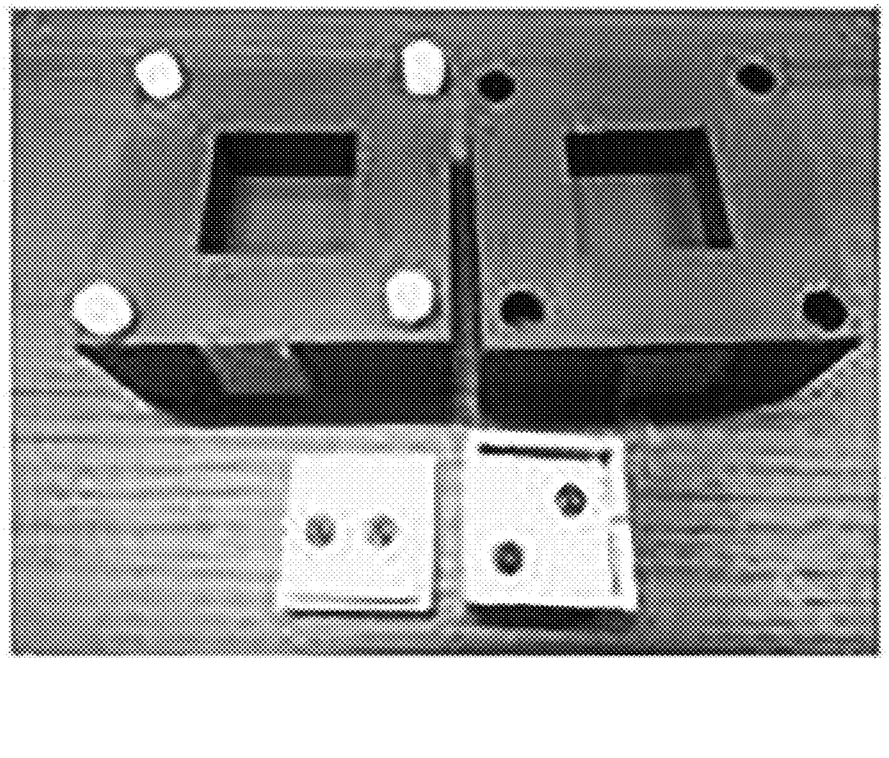

[FIG 12]
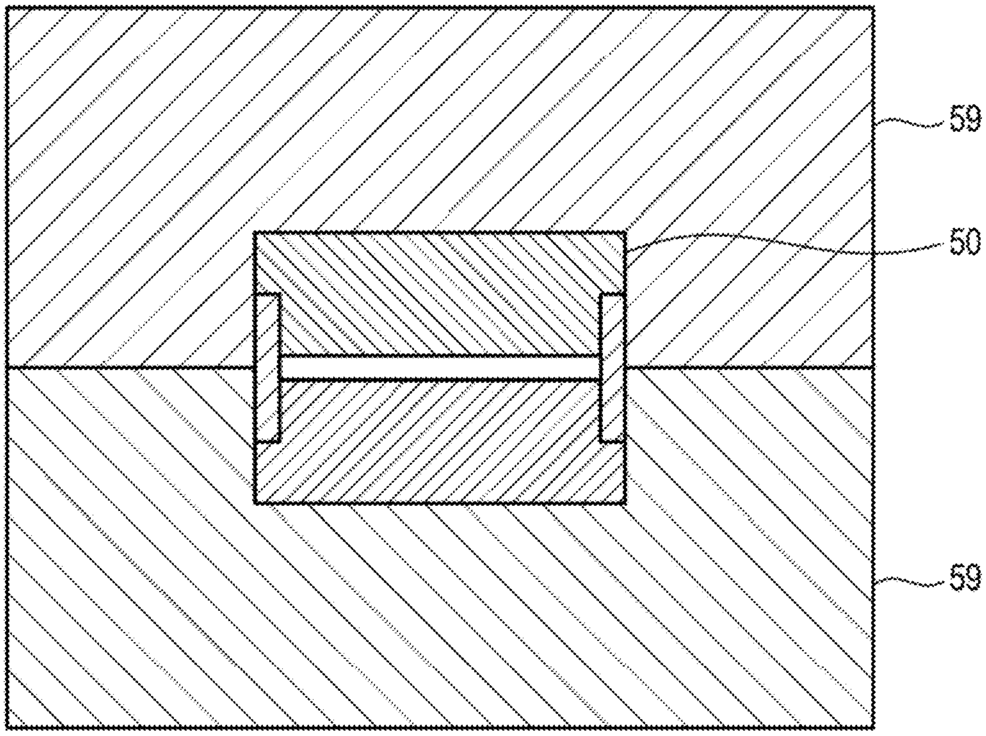

[FIG 13]
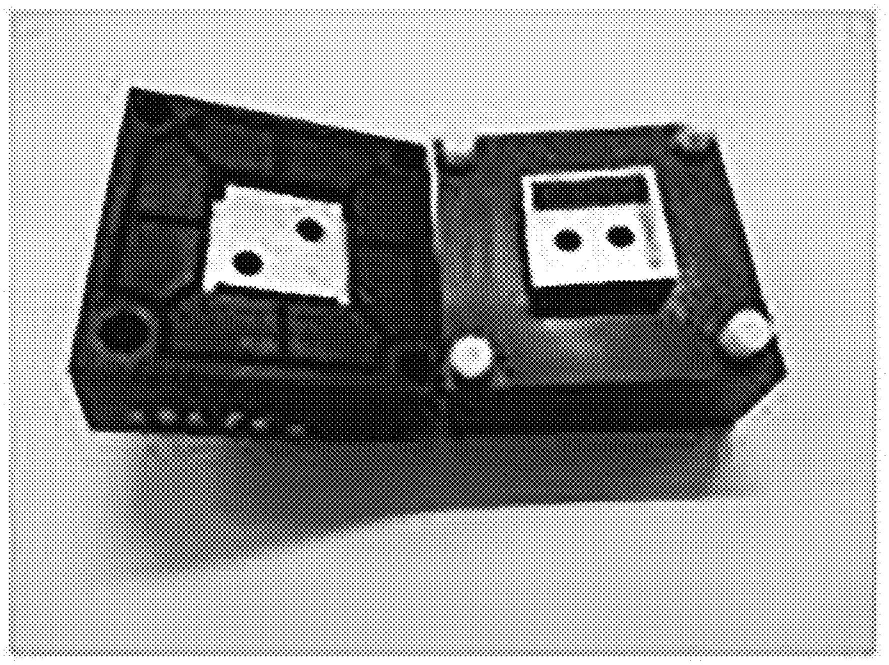

[FIG 14]
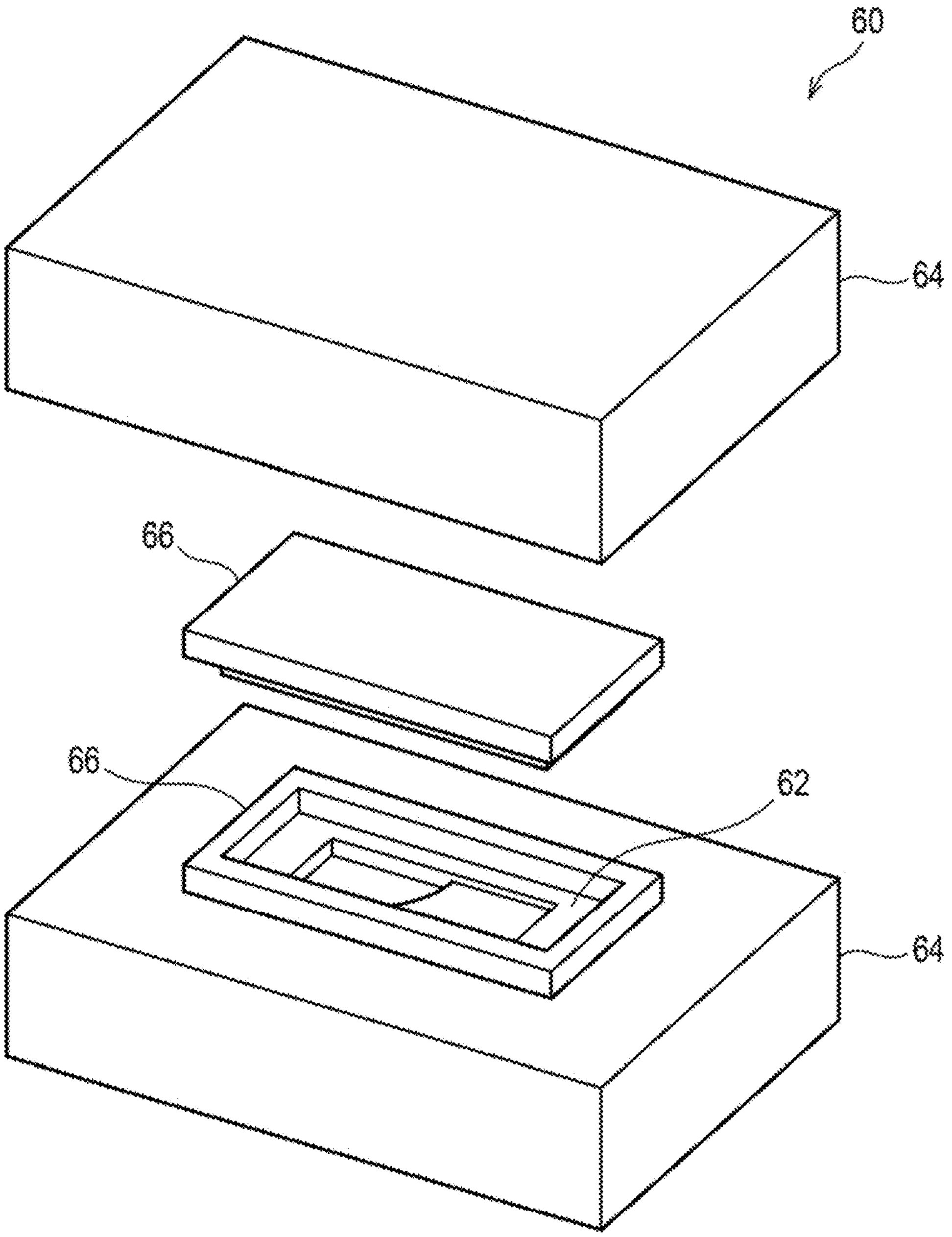

[FIG 15]
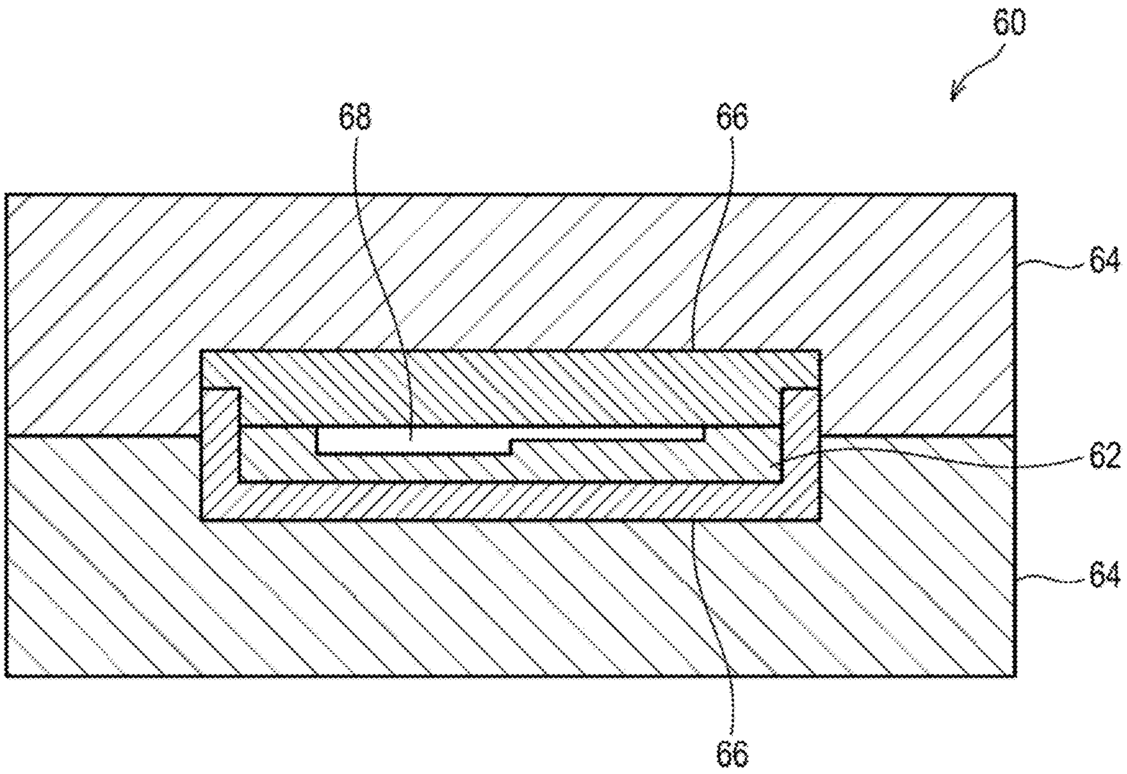

[FIG 16]
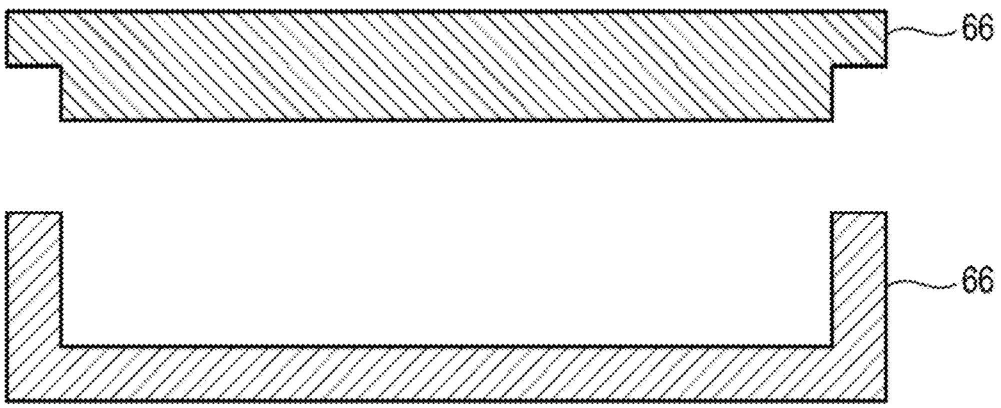

[FIG 17]
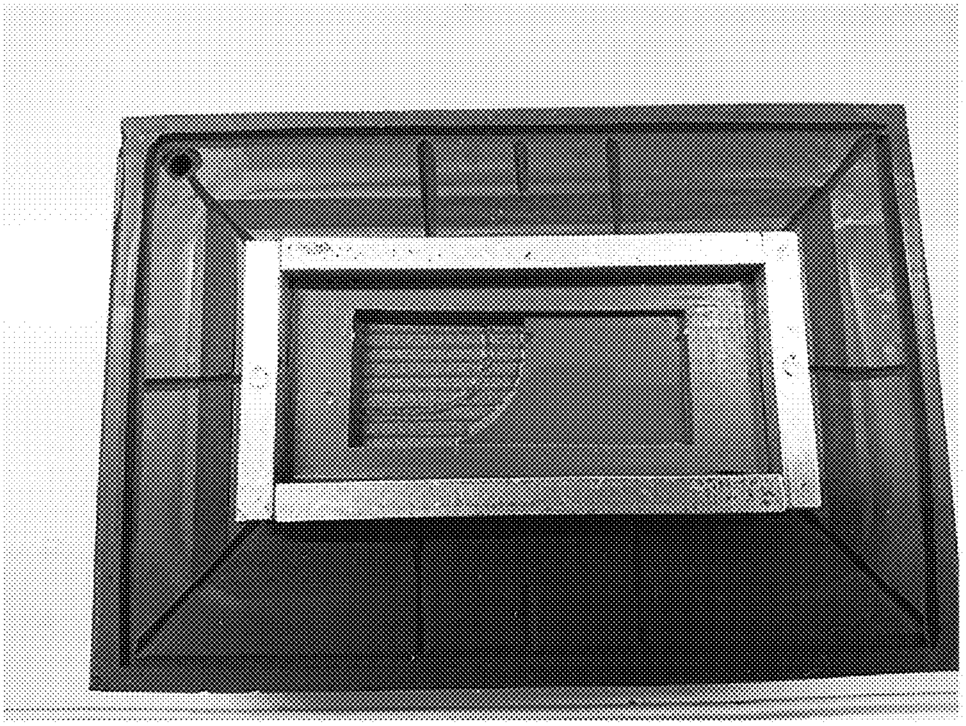

[FIG 18]
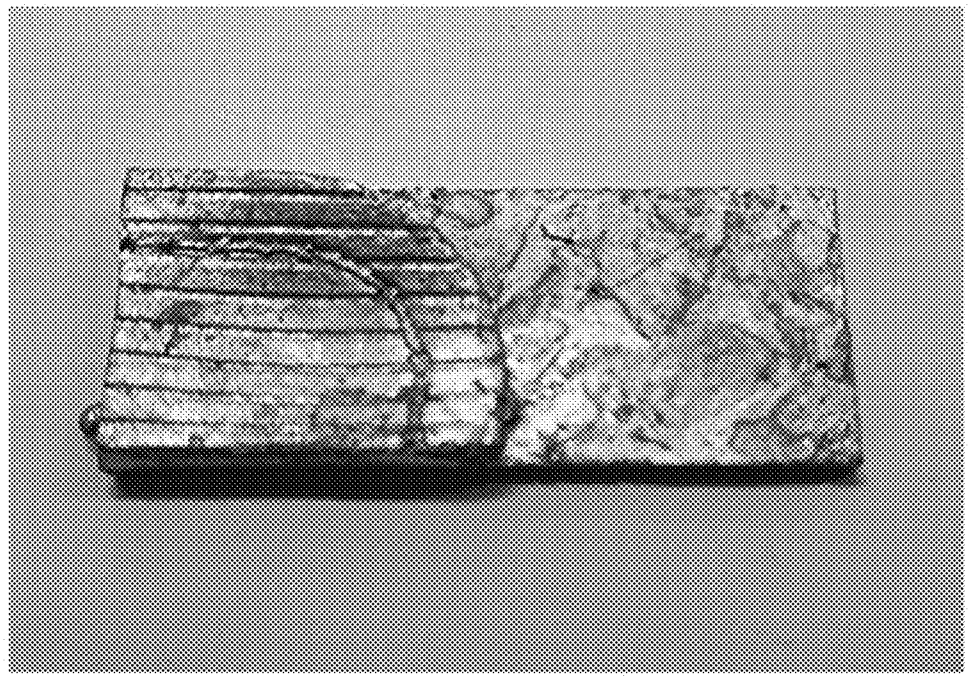

MOLDED BODY MANUFACTURING METHOD

CROSS REFERENCE TO RELATED APPLICATIONS

This application is a U.S. National Phase application under 35 U.S.C. 371 of International Application No. PCT/JP2022/000529, filed on Jan. 11, 2022, which claims priority to Japanese Patent Application No. 2021-012024, filed on Jan. 28, 2021. The entire disclosures of the above applications are expressly incorporated by reference herein.

BACKGROUND

Technical Field

The present invention relates to a molded body manufacturing method.

Related Art

A method described in, for example, WO 2012/173053 has heretofore been proposed as a molded body manufacturing method.

WO 2012/173053 describes an electromagnetic wave irradiation molding method which is a molding method using an electromagnetic wave irradiation molding apparatus comprising: a mold comprising an insulating material; and electromagnetic wave irradiation means for irradiating with specific electromagnetic waves comprising a wavelength region of 0.01 to 100 m, wherein: the mold is separated into a plurality of mold parts, between or among which a cavity configured to be filled with a thermoplastic resin is provided to form a molded article; and a surface layer having a capability to absorb the specific electromagnetic waves is formed on at least a part of an inner wall surface of the cavity, the method comprising: placing the thermoplastic resin in the cavity; heating the thermoplastic resin by irradiating the thermoplastic resin placed in the cavity with the specific electromagnetic waves comprising the wavelength region of 0.01 to 100 m by the electromagnetic wave irradiation means through the mold; and cooling the thermoplastic resin to obtain the molded article (see claims 1 and 5). It is also described that, in such a method, the thermoplastic resin itself produces heat so that the entire thermoplastic resin is more effectively heated, which makes it possible to melt the entire thermoplastic resin in a short time, and therefore, it is possible to stably form a molded article whose thickness greatly changes from part to part, a molded article having a complicated shape, or the like in an excellent appearance and with a high dimensional accuracy (see paragraphs 0007 and 0008).

The conventional molded body manufacturing method tended to restrict the kinds of applicable materials to a narrow range. However, the molded body manufacturing method is preferably applicable to various kinds of materials.

An object of the present invention is to solve the problem as described above. Specifically, an object of the present invention is to provide a molded body manufacturing method which is applicable to a wide range of kinds of materials.

SUMMARY

The inventor of the present invention has made an intensive study to solve the problem described above and completed the present invention.

The present invention provides the following (1) to (10).

(1) A molded body manufacturing method including:
  irradiating at least a part of a mold with electromagnetic waves or setting the at least a part of the mold in an alternating electric field after a material is introduced into a cavity of the mold, whereby a molded body is formed within the cavity,
  wherein in the mold,
  a heating element which generates heat by absorbing the electromagnetic waves or generates heat by being set in the alternating electric field is provided outside the cavity,
  a transmission amount suppressor which suppresses an amount of transmission of the electromagnetic waves or the alternating electric field to an inside of the cavity is provided in at least a part of a space between the heating element and the cavity, or at least a part of the cavity includes the transmission amount suppressor, and
  the heating element generates heat and the heat is transmitted to the material, whereby molding is performed.

(2) The molded body manufacturing method according to (1) above, wherein the heating element covers whole of the cavity.

(3) The molded body manufacturing method according to (1) or (2) above, wherein the transmission amount suppressor blocks out the transmission of the electromagnetic waves or the alternating electric field to the inside of the cavity.

(4) The molded body manufacturing method according to any one of (1) to (3) above,
  wherein:
  the cavity includes the transmission amount suppressor,
  the heating element is of a type in which the cavity is fitted into an inside thereof, and
  at least parts of outer surfaces of the cavity are in contact with inner surfaces of the heating element.

(5) The molded body manufacturing method according to any one of (1) to (4) above, wherein the material contains as its main component at least one selected from the group consisting of a thermoplastic resin, a thermosetting resin, a low melting point metal, and a low melting point non-metal.

(6) The molded body manufacturing method according to any one of (1) to (5) above, wherein the material contains a fiber material and/or a filler.

(7) The molded body manufacturing method according to any one of (1) to (6) above, wherein the heating element contains silicone rubber and/or fluoro rubber, and further contains, as a dielectric property-imparting substance, at least one selected from the group consisting of silicon carbide, ferrite, barium titanate, carbon black and graphite in an amount of 5 to 90 vol %.

(8) The molded body manufacturing method according to any one of (1) to (7) above, wherein the transmission amount suppressor contains metal and/or non-metal.

(9) The molded body manufacturing method according to (8) above, wherein the metal and/or the non-metal is at least one selected from the group consisting of aluminum, iron, copper, alloys containing them, and shielding glass.

(10) The molded body manufacturing method according to any one of (1) to (9) above, wherein a wavelength region of the electromagnetic waves falls within a range of 0.78 μm to 100 m.

Effect of the Invention

The present invention can provide a molded body manufacturing method which is applicable to a wide range of kinds of materials.

BRIEF DESCRIPTION OF THE DRAWINGS

FIG. 1 is a schematic cross-sectional view illustrating a preferred embodiment of a cavity.

FIG. 2 is a schematic cross-sectional view showing a mold in a case where a transmission amount suppressor is present between a heating element and the cavity.

FIG. 3 is a schematic cross-sectional view showing a mold in a case where a transmission amount suppressor is present between a heating element and the cavity so as to cover the whole of the cavity.

FIG. 4 is a schematic cross-sectional view showing a mold in a case where a heating element covers the cavity made up of a transmission amount suppressor.

FIG. 5 is a schematic cross-sectional view showing a case where the mold described using FIG. 4 is irradiated with electromagnetic waves.

FIG. 6 is a schematic cross-sectional view showing a case where the mold described using FIG. 4 is set in an alternating electric field.

FIG. 7 is a schematic perspective view of a cavity used in Examples.

FIG. 8 is a schematic cross-sectional view of the cavity used in Examples.

FIG. 9 is an appearance photo of the cavity used in Examples.

FIG. 10 is a schematic cross-sectional view in a state in which a material is introduced into the cavity used in Examples.

FIG. 11 is an appearance photo of a rubber mold.

FIG. 12 is a schematic cross-sectional view showing a state in which the cavity is fitted into the rubber mold.

FIG. 13 is an appearance photo showing a state in which the cavity is fitted into a central part of the rubber mold.

FIG. 14 is a schematic perspective view of another mold used in Examples.

FIG. 15 is a schematic cross-sectional view of the another mold used in Examples.

FIG. 16 is a schematic cross-sectional view of a transmission amount suppressor.

FIG. 17 is a photo showing that the transmission amount suppressor is fitted into a central part of a heating element and a cavity is formed inside the transmission amount suppressor.

FIG. 18 is a photo of a molded body obtained in Examples.

DETAILED DESCRIPTION

The present invention is now described.

The present invention provides a molded body manufacturing method including: irradiating at least a part of a mold with electromagnetic waves or setting the at least a part of the mold in an alternating electric field after a material is introduced into a cavity of the mold, whereby a molded body is formed within the cavity, wherein in the mold, a heating element which generates heat by absorbing the electromagnetic waves or generates heat by being set in the alternating electric field is provided outside the cavity, a transmission amount suppressor which suppresses the amount of transmission of the electromagnetic waves or the alternating electric field to the inside of the cavity is provided in at least a part of a space between the heating element and the cavity, or at least a part of the cavity includes the transmission amount suppressor, and the heating element generates heat and the heat is transmitted to the material, whereby molding is performed.

The molded body manufacturing method as described above is hereinafter referred to also as the "manufacturing method of the invention."

<Mold>

A mold used in the manufacturing method of the invention is now described.

<Heating Element>

The mold in the manufacturing method of the invention has a heating element.

Any heating element may be used as long as it generates heat by absorbing electromagnetic waves as described below or generates heat by being set in an alternating electric field as described below.

The heating element is preferably one obtained by adding a dielectric property-imparting substance to rubber, resin or ceramic. For example, the heating element may be a fired body obtained by adding a dielectric property-imparting substance to ceramic.

The heating element is preferably one obtained by incorporating a dielectric property-imparting substance in silicone rubber and/or fluoro rubber.

The dielectric property-imparting substance is a substance capable of imparting dielectric properties, and is preferably a substance having a dielectric power factor (dielectric tangent, tan δ) of 0.01 or more.

The dielectric property-imparting substance is preferably at least one selected from the group consisting of silicon carbide, ferrite, barium titanate, carbon black and graphite.

The dielectric property-imparting substance content of the heating element is preferably 5 to 90 vol %.

Preferably, the heating element contains silicone rubber and/or fluoro rubber, and further contains, as the dielectric property-imparting substance, at least one selected from the group consisting of silicon carbide, ferrite, barium titanate, carbon black and graphite in an amount of 5 to 90 vol %.

The dielectric property-imparting substance content of the heating element is more preferably 10 to 70 vol %, even more preferably 13 to 50 vol %, and still more preferably 15 to 35 vol %. One reason is that, when the dielectric property-imparting substance content of the heating element is in the above-defined ranges, the heating element is more likely to generate heat by absorbing electromagnetic waves as described below or is more likely to generate heat by being set in an alternating electric field as described below. Another reason is that local heat generation of the heating element is less likely to occur. There is a tendency that a spark (for example, a discharge phenomenon) is less likely to occur when the material is heated. Still another reason is that the heating element is more likely to develop necessary strength.

In a case where the dielectric property-imparting substance is in the form of powder, it preferably has an average particle size ($D_{50}$) of 3 to 800 μm, more preferably 4 to 500 μm, even more preferably 5 to 300 μm, still more preferably 6 to 100 μm, and still even more preferably 7 to 50 μm. One reason is that, when the average particle size of the dielectric property-imparting substance in the form of powder is in the above-defined ranges, the heating element is more likely to generate heat by absorbing electromagnetic waves as described below or is more likely to generate heat by being set in an alternating electric field as described below. Another reason is that the heating element is more likely to develop necessary strength.

The average particle size means $D_{50}$ determined from a weight-based particle size distribution obtained by screening.

The mold has such a heating element outside a cavity.

<Cavity>

The mold in the manufacturing method of the invention has a cavity.

The cavity is a mold part of the mold where a material is introduced, and in principle a molded body having the same shape as an internal space of the cavity is obtained.

The structure and the like of the cavity are described using a drawing. FIG. 1 is a schematic cross-sectional view of a preferred embodiment of the cavity. The cavity in the manufacturing method of the invention is not limited to the embodiment shown in FIG. 1.

As shown in FIG. 1, a cavity 10 may be divided into more than one (two in FIG. 1) and be configured by a combination of a first mold part 11 and a second mold part 12. In the embodiment case shown in FIG. 1, an internal space 15 for material filling is formed between the first mold part 11 and the second mold part 12 that form a pair. The internal space 15 in the cavity can be, for instance, formed by transferring a master model of a molded body to be obtained.

A vacuum hole to which a vacuum pump for bringing the inside of the internal space 15 into a lower pressure state than atmospheric pressure (for example, a vacuum state) is connected may be formed in the first mold part 11 or the second mold part 12.

In the embodiment case shown in FIG. 1, the first mold part 11 and the second mold part 12 are configured to be slidable with respect to each other. Sliding so as to approach each other causes the volume of the internal space 15 to be reduced.

The second mold part 12 preferably has guide portions 121 for the first mold part 11 and the second mold part 12 to slide relatively. When the first mold part 11 and the second mold part 12 approach each other, the volume of the internal space 15 is reduced and the material in the internal space 15 is pressed against inner walls of the internal space 15.

The internal space 15 in the embodiment shown in FIG. 1 is a space surrounded by inner surfaces of the first mold part 11 and the second mold part 12 which make up the cavity. In the manufacturing method of the invention, however, the internal space 15 may be any space as long as at least a part of the space is surrounded by inner surfaces of a member making up the cavity. For example, the internal space may be a space surrounded by inner surfaces of a portion making up the cavity and inner surfaces of a transmission amount suppressor.

<Transmission Amount Suppressor>

The mold in the manufacturing method of the invention has a transmission amount suppressor in at least a part of a space between the heating element and cavity as described above, or at least a part of the cavity is made up of a transmission amount suppressor.

The transmission amount suppressor may be made of any substance as long as it can suppress the amount of transmission of electromagnetic waves or an alternating electric field to the inside of the cavity. Specifically, any substance may be used as long as it can suppress the amount of transmission of electromagnetic waves or an alternating electric field to the inside of the cavity to such a degree that a spark or thermal runaway of a material in the cavity does not occur. Thermal runaway means a phenomenon that the temperature increases in a short period of time, making it difficult to control the temperature.

The transmission amount suppressor is preferably made of a substance that can block out the amount of transmission of electromagnetic waves or an alternating electric field to the inside of the cavity.

The transmission amount suppressor preferably contains metal and/or non-metal.

The metal and/or non-metal content of the transmission amount suppressor is preferably 50 mass % or more, more preferably 65 mass % or more, even more preferably 80 mass % or more, still more preferably 95 mass % or more, and still even more preferably substantially 100 mass %. Substantially means that it is only allowed to contain unavoidable impurities that may be incorporated from a material or during a manufacturing process.

Specifically, the metal is preferably at least one selected from the group consisting of aluminum, iron, copper, and alloys containing them. The alloy containing aluminum, iron and/or copper may be any alloy as long as it contains at least one of aluminum, iron and copper, and an example is brass (alloy of copper and zinc).

The non-metal is preferably shielding glass.

These can suppress or block out the amount of transmission of electromagnetic waves or an alternating electric field to the inside of the cavity.

<Structure of Mold>

A case where the mold has the transmission amount suppressor in at least a part of a space between the heating element and cavity as described above is described using FIG. 2 and FIG. 3.

FIG. 2 is a schematic cross-sectional view showing a mold 1*a* in a case where a transmission amount suppressor 30*a* is present between a heating element 20*a* and the cavity 10. FIG. 3 is a schematic cross-sectional view showing a mold 1*b* in a case where a transmission amount suppressor 30*b* is present between a heating element 20*b* and the cavity 10 so as to cover the whole of the cavity 10.

Embodiments shown in FIG. 2 and FIG. 3 are preferred examples and the mold in the manufacturing method of the invention is not limited thereto.

In the mold 1*a* shown in FIG. 2, the heating element 20*a* is present outside the cavity 10 and the transmission amount suppressor 30*a* is present therebetween. In a case where at least a part of the mold 1*a* as described above (a portion including at least a part of the heating element 20*a*) is irradiated with electromagnetic waves, or in a case where at least a part of the mold 1*a* (a portion including at least a part of the heating element 20*a*) is set in an alternating electric field, the heating element 20*a* generates heat. Even in a case where at least a part of the heating element 20*a* in the mold 1*a* is only irradiated with electromagnetic waves, or in a case where at least a part of the heating element 20*a* in the mold 1*a* is only set in an alternating electric field, the heating element 20*a* generates heat.

Then, the heat is transmitted to a material present in the internal space 15 of the cavity 10 through the transmission amount suppressor 30*a* and the like, and the heat causes the material to be melted or cured, whereby molding is performed. The transmission amount suppressor 30*a* is present between the heating element 20*a* and the cavity 10, and therefore the amount of transmission of the electromagnetic waves or the alternating electric field to the cavity 10 in a direction from the heating element 20*a* toward the cavity 10 is suppressed or blocked out.

In the mold 1*b* shown in FIG. 3, the heating element 20*b* is present outside the cavity 10 and the transmission amount suppressor 30*b* is present therebetween. In the embodiment case shown in FIG. 3, the transmission amount suppressor 30*b* covers the whole of the cavity 10 and further the heating element 20*b* covers the whole of the transmission amount suppressor 30*b* (the same holds true for the front side and the back side in FIG. 3). In other words, the heating element 20*b* covers the whole of the cavity 10. The transmission amount suppressor 30*b* may be of a type in which the cavity 10 is fitted into the inside thereof. The transmission amount suppressor 30*b* may be made of a plate (for example, a net-like plate). The heating element 20*b* may be of a type in which the transmission amount suppressor 30*b* is fitted into the inside thereof.

In a case where at least a part of the mold 1*b* as described above is irradiated with electromagnetic waves, or in a case where at least a part of the mold 1*b* is set in an alternating electric field, the heating element 20*b* generates heat. Then, the heat is transmitted to a material present in the internal space 15 of the cavity 10 through the transmission amount suppressor 30*b* and the like, and the heat causes the material to be melted or cured, whereby molding is performed. The transmission amount suppressor 30*b* is present between the heating element 20*b* and the cavity 10, and therefore the amount of transmission of the electromagnetic waves or the alternating electric field to the internal space 15 of the cavity 10 is suppressed or blocked out.

In the embodiments shown in FIG. 2 and FIG. 3, the mold (1*a* or 1*b*) may have another portion between the cavity 10 and the transmission amount suppressor (30*a* or 30*b*) or between the transmission amount suppressor (30*a* or 30*b*) and the heating element (20*a* or 20*b*).

When the mold is according to the embodiment as shown in FIG. 2 or FIG. 3, the cavity 10 may be made of any material as long as it is not softened under the condition that the material within the internal space 15 is melted or cured. Examples thereof include curable resin materials (thermosetting resin materials, photocurable resin materials, and the like), cement materials, gypsum materials, and various non-metal materials having heat resistance, and the cavity is preferably made of a rubber material.

In addition to silicone rubber and fluoro rubber, various rubbers can be used as rubber materials.

When the mold used is one according to the embodiment shown in FIG. 2 or FIG. 3 as described above, the following embodiment in the manufacturing method of the invention can be performed.

Specifically, can be performed a molded body manufacturing method including:

irradiating at least a part of a mold with electromagnetic waves or setting the at least a part of the mold in an alternating electric field after a material is introduced into a cavity of the mold, whereby a molded body is formed within the cavity, wherein in the mold, a heating element which generates heat by absorbing the electromagnetic waves or generates heat by being set in the alternating electric field is provided outside the cavity, a transmission amount suppressor which suppresses (preferably blocks out) the amount of transmission of the electromagnetic waves or the alternating electric field to the inside of the cavity is provided in at least a part of a space between the heating element and the cavity, and the heating element generates heat and the heat is transmitted to the material, whereby molding is performed.

Next, a case where at least a part of the cavity in the mold is made up of the transmission amount suppressor is described using FIG. 4.

FIG. 4 is a schematic cross-sectional view showing a mold 1*c* in a case where a heating element 20*c* covers the cavity 10 made up of the transmission amount suppressor.

An embodiment shown in FIG. 4 is a preferred example and the mold in the manufacturing method of the invention is not limited thereto. For instance, only a part of the cavity may be made up of the transmission amount suppressor.

In the mold 1*c* shown in FIG. 4, the cavity 10 is made up of the transmission amount suppressor. Then, in the embodiment case shown in FIG. 4, the heating element 20*c* covers the whole of the cavity 10.

In the preferred embodiment shown in FIG. 4, the heating element 20*c* is of a type in which the cavity 10 is fitted into the inside thereof. Specifically, the heating element 20*c* shown in FIG. 4 has one mold 201*c* and the other mold 202*c*, and these are configured to be slidable with respect to each other. When the one mold 201*c* and the other mold 202*c* slide to approach each other, the first mold 11 and the second mold 12 of the cavity 10 inside them approach each other. At least parts of outer surfaces of the cavity 10 (in principle all outer surfaces) are in contact with inner surfaces of the heating element 20*c*.

In the embodiment case shown in FIG. 4, the other mold 202*c* has a vacuum hole 25 to which a vacuum pump for bringing the inside of the heating element 20*c* into a lower pressure state than atmospheric pressure (for example, a vacuum state) is connected. When the inside of the heating element 20*c* is brought into a lower pressure state than atmospheric pressure (for example, a vacuum state), the one mold 201*c* and the other mold 202*c* approach each other, and the first mold 11 and the second mold 12 of the cavity 10 inside them approach each other.

In a case where at least a part of the mold 1*c* as shown in FIG. 4 is irradiated with electromagnetic waves, or in a case where at least a part of the mold 1*c* is set in an alternating electric field, the heating element 20*c* generates heat. Even in a case where at least a part of the heating element in the mold 1*c* is only irradiated with electromagnetic waves, or in a case where at least a part of the heating element in the mold 1*c* is only set in an alternating electric field, the heating element 20*c* generates heat.

Entire outer surfaces of the heating element in the mold 1*c* are preferably irradiated with electromagnetic field.

Then, the heat is transmitted to a material present in the internal space 15 of the cavity 10 made up of the transmission amount suppressor, and the heat causes the material to be melted or cured, whereby molding is performed. The cavity 10 is made up of the transmission amount suppressor, and therefore the amount of transmission of the electromagnetic waves or the alternating electric field to the internal space 15 of the cavity 10 is suppressed or blocked out.

In the embodiment shown in FIG. 4, the mold 1*c* may have another portion between the cavity 10 and the heating element 20*c*.

In a case where at least a part of the cavity in the mold is made up of the transmission amount suppressor, the heating element needs only be present outside the cavity and, as shown in FIG. 4, the heating element may not cover the whole of the cavity. The heating element may not be of a type in which the cavity is fitted into the inside thereof.

In a case where the cavity is made up of the transmission amount suppressor as shown in FIG. 4, and the transmission amount suppressor contains metal and/or non-metal or other substances having a high melting point (preferably in amounts of 50 mass % or more, more preferably 65 mass % or more, even more preferably 80 mass % or more, still more preferably 95 mass % or more, and still even more preferably substantially 100%), the manufacturing method of the invention can be performed by using a material which is to be treated at a higher temperature.

Conventionally, for instance, in a case where a cavity made of silicone rubber or fluoro rubber, or a cavity made of a mixture obtained by adding a dielectric property-imparting substance (silicon carbide, ferrite, barium titanate, carbon black, graphite or the like) to silicone rubber or fluoro rubber was used, the cavity was occasionally softened at high temperatures (for example, not lower than about 250° C.). In such a case, it was difficult to manufacture a molded body using a material having a high melting point (for example, a material having a melting point of not lower than about 250° C.) because the cavity is softened at a temperature at which the material is melted or cured. Examples of the material having a high molding temperature include PA66, PET, and PBT.

In contrast, in a case where the transmission amount suppressor making up the cavity in the manufacturing method of the invention contains metal and/or non-metal having a high melting point, as exemplified by at least one selected from the group consisting of aluminum, iron, copper, alloys containing them, and shielding glass (preferably in amounts of 50 mass % or more, more preferably 65 mass % or more, even more preferably 80 mass % or more, still more preferably 95 mass % or more, and still even more preferably substantially 100%), a molded body can be manufactured by using a material having a high molding temperature.

In a case where the mold is according to the embodiment as shown in FIG. 4, and a part of the cavity 10 is made up of the transmission amount suppressor, the other part of the cavity 10 should be made of a material which is not softened under the condition that the material within the internal space 15 is melted or cured. Examples thereof include curable resin materials (thermosetting resin materials, photocurable resin materials, and the like), cement materials, gypsum materials, and various non-metal materials having heat resistance, and it is preferably made of a rubber material.

In addition to silicone rubber and fluoro rubber, various rubbers can be used as rubber materials.

When the mold used is one according to the embodiment shown in FIG. 4 as described above, the following embodiment in the manufacturing method of the invention can be performed.

Specifically, can be performed a molded body manufacturing method including:

irradiating at least a part of a mold with electromagnetic waves or setting the at least a part of the mold in an alternating electric field after a material is introduced into a cavity of the mold, whereby a molded body is formed within the cavity, wherein in the mold, a heating element which generates heat by absorbing the electromagnetic waves or generates heat by being set in the alternating electric field is provided outside the cavity, at least a part of the cavity is made up of a transmission amount suppressor which suppresses (preferably blocks out) the amount of transmission of the electromagnetic waves or the alternating electric field to the inside of the cavity, and the heating element generates heat and the heat is transmitted to the material, whereby molding is performed.

In such an embodiment, the heating element preferably covers the whole of the cavity.

[Manufacturing Method]

In the manufacturing method of the invention, a material is first introduced into the cavity of the mold as described above.

The material is not particularly limited as long as a substance which is melted or cured by heat generated in the heating element and transmitted into the cavity through the transmission amount suppressor and the like is a main component.

The material preferably contains as its main component at least one selected from the group consisting of a thermoplastic resin, a thermosetting resin, a low melting point metal, and a low melting point non-metal.

The expression “main component” means that the content is 50 mass % or more. The content is preferably 65 mass % or more, more preferably 80 mass % or more, even more preferably 95 mass % or more, and still more preferably substantially 100%.

Substantially means that it is only allowed to contain unavoidable impurities that may be incorporated from a material or during a manufacturing process.

Unless otherwise specified, the main component has the foregoing meaning in the manufacturing method of the invention.

Examples of the thermoplastic resin that may be used as the material include rubber reinforced styrene resins such as ABS resins (acrylonitrile-butadiene-styrene resins), ASA resins (acrylate-styrene-acrylonitrile resins), and AES resins (acrylonitrile-(ethylene-propylene-diene)-styrene resins), styrene resins such as polystyrenes, styrene-acrylonitrile copolymers, styrene-maleic anhydride copolymers, and (meth)acrylic acid ester-styrene copolymers, olefin resins such as polyethylenes and polypropylenes, acrylic resins, polycarbonate resins, polyester resins such as PBT resins (polybutylene terephthalate resins), polyamide resins such as meta-xylylenediamine polyamide resins, vinyl chloride resins, polyarylate resins, polyacetal resins, polyphenylene ether resins, PPS resins (polyphenylene sulfide resins), fluoro resins, imide resins, ketone resins such as PEEK resins (polyether ether ketone resins), sulfone resins, urethane resins, polyvinyl acetates, polyethylene oxides, polyvinyl alcohols, polyvinyl ethers, polyvinyl butyrals, phenoxy resins, light-sensitive resins, liquid crystal polymers, biodegradable plastics, and flexible resins (elastomer resins).

The thermoplastic resin may be a thermoplastic elastomer (styrene type, olefin type, vinyl chloride type, vinyl acetate type, urethane type, polyester type or the like).

In a case where the thermoplastic resin is used as a material, the material is melted within the cavity by heat emitted from the heating element. The amount of transmission of electromagnetic waves or an alternating electric field to the internal space of the cavity is suppressed or blocked out, so that in principle self-heating does not occur. Conventionally, in a case where a material having a strong self-heating behavior such as nylon resin was used, self-heating occasionally caused thermal runaway. In the manufacturing method of the invention, the material does not cause in principle self-heating, so that a molded body can be manufactured by using nylon resin or the like as the material.

In a case where the thermoplastic resin is used as the material, the thermoplastic resin in the shape of granules or flakes may be used. In this case, its average particle size is preferably 0.2 to 5 mm and more preferably 0.5 to 3 mm. The average particle size means $D_{50}$ determined from a weight-based particle size distribution obtained by screening.

A preform made of a thermoplastic resin can be used as the material. The preform having a three-dimensional shape is formed by any method using the thermoplastic resin, and an example is one having a three-dimensional shape obtained by depositing in layers using an additive manufacturing process. Examples of the additive manufacturing process include a process using various 3D printers for depositing in layers thermoplastic resin discharged from a nozzle in a string-like form (linear form) or a granular form to create a three-dimensional shape (AM: Additive Manufacturing), FDM (Fused Deposition Modeling) (material extrusion deposition), an extrusion molding process, an ink-jet process, and a particulate matter binding process.

Examples of the thermosetting resin that may be used as the material include phenolic resin, epoxy resin, melamine resin, urea resin, unsaturated polyester resin, alkyd resin, polyurethane, and thermosetting polyimide.

In a case where the thermosetting resin is used as the material, in the manufacturing method of the invention, the material is cured by heat emitted from the heating element to yield a molded body.

Examples of the low melting point metal that may be used as the material include alloys containing as their main components zinc, indium, gallium, tin, bismuth, lead, and the like.

In a case where the low melting point metal is used as the material, in the manufacturing method of the invention, the material is melted by heat emitted from the heating element.

An example of the low melting point non-metal that may be used as the material is glass.

In a case where the low melting point non-metal is used as the material, in the manufacturing method of the invention, the material is melted by heat emitted from the heating element.

The material contains as its main component a substance which is melted or cured by heat emitted from the heating element and transmitted into the cavity through the transmission amount suppressor and the like, as exemplified by at least one selected from the group consisting of a thermoplastic resin, a thermosetting resin, a low melting point metal, and a low melting point non-metal. The material may contain as other components a high melting point metal, a high melting point non-metal (ceramic or the like), a UV curable resin, a fiber material (CF (carbon fiber), GF (glass fiber), a metal fiber (SUS fiber or the like), fiberglass or the like), a softener, (a plasticizer, an oil, or the like), a colorant (a pigment or the like), an impact resistance modifier (a rubber component or the like), an antistatic agent, an electrically conductive material, a filler (a thermally conductive filler, a metallic filler or the like), a flame retardant, a heat resistant resin, a low heat storage resin, a sliding property modifier, or the like.

Conventionally, in a case where the material contained a fiber material such as CF or SUS fiber, or a filler, when at least a part of the mold was irradiated with electromagnetic waves or was set in an alternating electric field, a spark occasionally occurred from the fiber material as the starting point. In contrast, according to the manufacturing method of the invention, a spark is less likely to occur even when the material contains a fiber material or a filler.

In the manufacturing method of the invention, after the material as described above is introduced into the cavity of the mold, at least a part of the mold is irradiated with electromagnetic waves or is set in an alternating electric field.

<Irradiation with Electromagnetic Waves>

In a case where at least a part of the mold is irradiated with electromagnetic waves after the material as described above is introduced into the cavity of the mold, the method is not particularly limited, as long as irradiation with electromagnetic waves which can cause the heating element of the mold to generate heat is possible. At least all or parts of surfaces of the heating element need only be irradiated with electromagnetic waves.

A case where the mold is irradiated with electromagnetic waves is described using FIG. 5. FIG. 5 is a schematic cross-sectional view illustrating a case where the mold 1*c* described using FIG. 4 is irradiated with electromagnetic waves.

In FIG. 5, the material is introduced into the internal space 15 which is present between the first mold 11 and the second mold 12 that form a pair in the cavity 10.

The vacuum hole 25 formed in the other mold 202*c* is connected to a vacuum pump 40, which can be driven to bring the inside of the heating element 20*c* into a lower pressure state than atmospheric pressure (for example, a vacuum state).

Then, the mold 1*c* can be irradiated with electromagnetic waves generated from an electromagnetic wave generator 42.

The electromagnetic wave generator 42 can preferably generate electromagnetic waves having a wavelength region of 0.78 μm to 100 m. In other words, the wavelength region of the generated electromagnetic waves falls preferably within a range of 0.78 μm to 100 m.

The electromagnetic wave generator 42 can preferably generate electromagnetic waves having a wavelength region of 0.78 to 2 μm (near infrared rays), electromagnetic waves having a wavelength region of 0.01 to 1 m (microwaves), or electromagnetic waves having a wavelength region of 1 to 100 m (high frequency waves).

When near infrared rays are to be generated, the electromagnetic wave generator 42 may be a halogen lamp.

When microwaves are to be generated, the electromagnetic wave generator 42 may be a microwave oscillator.

When high frequency waves are to be generated, the electromagnetic wave generator 42 may be a high frequency oscillator.

<Setting in Alternating Electric Field>

In a case where at least a part of the mold is set in an alternating electric field after the material as described above is introduced into the cavity of the mold, the method is not particularly limited, as long as it is possible to generate heat from the heating element of the mold by setting the mold within the alternating electric field. At least the whole or a part of the heating element need only be set within the alternating electric field.

A case where the mold is set in an alternating electric field is described using FIG. 6. FIG. 6 is a schematic cross-sectional view illustrating a case where the mold 1*c* described using FIG. 4 is set in an alternating electric field.

In FIG. 6, the internal space 15 which is present between the first mold 11 and the second mold 12 that form a pair in the mold 1*c* is filled with a material.

The vacuum hole 25 formed in the other mold 202$c$ is connected to the vacuum pump 40, which can be driven to bring the inside of the heating element 20$c$ into a lower pressure state than atmospheric pressure (for example, a vacuum state).

Then, a dielectric heater 44 can be used to apply an alternating electric field to the mold 1$c$ with a high frequency alternating voltage applied to electrodes 441 and 442 that form a pair. The alternating voltage from the dielectric heater 44 preferably has a frequency of high frequency waves as electromagnetic waves having a wavelength region of 1 m to 10 m.

The manufacturing method of the invention as described above is applicable to a wide range of kinds of materials.

Conventionally known pellets can be used as a material. The molded body has a high dimensional accuracy as compared to conventional techniques. The cooling time can be shortened as compared to the conventional techniques.

EXAMPLES

Examples of the present invention are now described. The present invention should not be construed as being limited to examples to be described below.

Example 1

First, a mold was prepared. The mold is according to the same embodiment as shown in FIG. 4 in which a cavity is made up of a transmission amount suppressor and is fitted into the inside of a rubber mold which is a heating element.

An aluminum extrusion material (5052 material) was processed into the cavity in the mold.

FIG. 7 shows a schematic perspective view of the cavity, FIG. 8 shows a schematic cross-sectional view of the cavity, and FIG. 9 shows an appearance photo of the cavity.

As shown in FIG. 7, a cavity 50 has a structure obtained by combining three parts including an upper part 51, a central part 52, and a lower part 53. The cavity 50 in which parts of the upper part 51 and the lower part 53 shown in FIG. 7 are fitted into the central part 52 has a cross-sectional surface as shown in FIG. 8.

Each part in the cavity 50 has dimensions as shown in FIG. 8. Specifically, when seen from above, each of the upper part 51, the central part 52, and the lower part 53 has a square shape having each side length of about 30 mm. Each of the upper part 51 and the lower part 53 has a thickness (maximum thickness) of 10 mm, and portions of the upper part 51 and the lower part 53 fitted into (entering) the inside of the central part 52 when the former are fitted with the latter have thicknesses of 5 mm, respectively. The central part 52 has a thickness (length in a direction parallel to the thickness direction of the upper part 51 and the lower part 53) of 12 mm. Therefore, when the upper part 51 and the lower part 53 are fitted into the central part 52, an internal space 55 having an approximately rectangular solid shape which has a thickness of 2 mm and has an approximately square base with each side length of 26 mm appears within the central part 52.

As shown in FIG. 10, when a material 57 is introduced into the internal space 55, the material 57 is completely covered by the upper part 51, the central part 52, and the lower part 53. Transmission of electromagnetic waves or an alternating electric field to the inside of the cavity is thus blocked out.

FIG. 10 is a schematic cross-sectional view showing a state just after the material 57 is introduced into the internal space 55, and when the material 57 is heated, voids within the material 57 are reduced and the distance between the upper part 51 and the lower part 52 is accordingly reduced, (in other words, the upper part 51 and the lower part 52 approach each other), thus reducing the internal space 55.

The rubber mold is according to an embodiment in which the cavity is fitted into the inside thereof as in an appearance photo shown in FIG. 11. FIG. 11 also showed the same cavity as shown in FIG. 9 together with the rubber mold. FIG. 12 is a schematic cross-sectional view showing a state in which the cavity 50 shown in FIG. 8 is fitted into a rubber mold 59. Further, FIG. 13 is an appearance photo showing a state in which the cavity shown in FIG. 11 is fitted into the central part of the rubber mold.

Silicon carbide was incorporated in silicone as a dielectric property-imparting substance, and the mixture was kneaded and cured. Thereafter, the cured product was hollowed around its center so that the cavity was fitted thereinto, thus obtaining the rubber mold.

The mold used in Example 1 is thus according to an embodiment in which the rubber mold as the heating element covers the whole of the cavity, the cavity is fitted into the inside of the rubber mold and in principle all outer surfaces of the cavity are in contact with inner surfaces of the rubber mold.

Two holes which connect the outside of the rubber mold to the cavity set inside the mold were formed in the rubber mold.

Then, an alumina sheathed tube was inserted into one hole. The sheathed tube is set so as to come into contact with an outer surface of the inside cavity and a configuration is made so that the outer surface temperature of the cavity can be continuously measured by inserting a fiber optic thermometer into the sheathed tube.

A configuration is made so that the other hole is connected to a tube leading to a vacuum pump, and the inside of the cavity can be brought into a reduced pressure state by driving the vacuum pump. This hole corresponds to the vacuum hole 25 shown in FIG. 4.

The mold as described above was used to charge a material so as to fill the internal space within the cavity therewith.

Micropellets of nylon resin AMILAN CM1011G-30 (manufactured by Toray Industries, Inc.) were used as the material. The micropellets have a particle size of about 0.8 to 1 mm.

The material was charged into the cavity and the cavity was closed. Thereafter, the cavity was fitted into the inside of the rubber mold, the rubber mold was closed, and a heat resistant tape was applied to highly hermetically seal the rubber mold so that it may not open.

Thereafter, the fiber optic thermometer was inserted into the sheathed tube so that the outer surface temperature of the cavity could be continuously measured. The tube leading to the vacuum pump was connected to the other hole formed in the rubber mold.

Then, the mold was set within a microwave molding apparatus and molding was performed by irradiating the mold with electromagnetic waves while evacuating with the vacuum pump so that the internal pressure of the rubber mold became −95 kPa.

The molding temperature during molding, the temperature elevation rate, and the retention time at the molding temperature are shown in Table 1. The molding temperature and the temperature elevation rate were adjusted while measuring with the fiber optic thermometer inserted into the sheathed tube.

Example 2

PC/ABS resin NS0031 (SABIC Japan Llc.) was used as the material. The material contains an SUS filler in an amount of 15 mass %.

Apart from that, molding was performed in the same manner as in Example 1.

The molding temperature during molding, the temperature elevation rate, and the retention time at the molding temperature were changed in accordance with the properties of the material. The molding temperature during molding, the temperature elevation rate, and the retention time at the molding temperature are shown in Table 1.

Example 3

Nylon resin PA6CF30 (manufactured by Toray Industries, Inc.) was used as the material. It contains carbon fibers in an amount of 30 mass %.

Apart from that, molding was performed in the same manner as in Example 1.

The molding temperature during molding, the temperature elevation rate, and the retention time at the molding temperature were changed in accordance with the properties of the material. The molding temperature during molding, the temperature elevation rate, and the retention time at the molding temperature are shown in Table 1.

Example 4

Pellets of polyester resin (PBT resin), 1101G-30 (manufactured by Toray Industries, Inc.) were used as the material. The pellets have a particle size of about 0.8 to 1 mm.

Apart from that, molding was performed in the same manner as in Example 1.

The molding temperature during molding, the temperature elevation rate, and the retention time at the molding temperature were changed in accordance with the properties of the material. The molding temperature during molding, the temperature elevation rate, and the retention time at the molding temperature are shown in Table 1.

Example 5

Meta-xylylene diamine polyamide resin (MXD6 C-408, carbon long fiber grade) was used as the material. This material is in the form of pellets containing a carbon filler in an amount of 40 mass %.

Apart from that, molding was performed in the same manner as in Example 1.

The molding temperature during molding, the temperature elevation rate, and the retention time at the molding temperature were changed in accordance with the properties of the material. The molding temperature during molding, the temperature elevation rate, and the retention time at the molding temperature are shown in Table 1.

Example 6

Carbon fiber reinforced PPS resin A630T-30V (manufactured by Toray Industries, Inc.) was used as the material. It contains carbon fibers in an amount of 30 mass %.

Apart from that, molding was performed in the same manner as in Example 1.

The molding temperature during molding, the temperature elevation rate, and the retention time at the molding temperature were changed in accordance with the properties of the material. The molding temperature during molding, the temperature elevation rate, and the retention time at the molding temperature are shown in Table 1.

Example 7

Micropellets of PEEK resin (thermoplastic super engineering plastic), VESTAKEEP 2000P (Evonik Industries AG) were used as the material. The micropellets have a particle size of about 0.8 to 1.0 mm.

Apart from that, molding was performed in the same manner as in Example 1.

The molding temperature during molding, the temperature elevation rate, and the retention time at the molding temperature were changed in accordance with the properties of the material. The molding temperature during molding, the temperature elevation rate, and the retention time at the molding temperature are shown in Table 1.

TABLE 1

| | Molding temperature (° C.) | Temperature elevation rate (° C./min) | Retention time (sec) |
|---|---|---|---|
| Example 1 | 230 | 10 | 60 |
| Example 2 | 210 | 15 | 60 |
| Example 3 | 220 | 15 | 60 |
| Example 4 | 220 | 15 | 60 |
| Example 5 | 220 | 15 | 60 |
| Example 6 | 270 | 15 | 60 |
| Example 7 | 330 | 15 | 60 |

In each of Examples 1 to 7, after the completion of molding, the mold was taken out of the inside of the microwave molding apparatus and cooled for 1 hour by blowing air thereonto using a fan while continuing evacuation.

As a result, a molded body could be obtained in all of Examples 1 to 7. During the fabrication process, thermal runaway or sparks due to self-heating of the material did not occur.

Separately from this, in each of Examples 1 to 7, after the completion of molding, the mold was taken out of the inside of the microwave molding apparatus, evacuation was stopped, only the cavity was taken out of the inside of the rubber mold, and the cavity was cooled by blowing air thereonto using the fan. In this case, the cavity was cooled in five minutes, so that a molded body could be taken out of the inside of the cavity. At that time, the molded body did not have any problems such as deformation.

Example 8

A mold which was different from the one used in Examples 1 to 7 was prepared.

The mold used in Example 8 is according to an embodiment in which a rubber heating element is present outside a rubber cavity, and a transmission amount suppressor is present therebetween. The transmission amount suppressor has a form in which the cavity is present in its interior in a closely attached state and can cover the whole of the cavity. Further, the heating element has a form in which the transmission amount suppressor is fitted into the inside thereof and can cover the whole of the transmission amount suppressor.

This mold is similar to that in the embodiment shown in FIG. 3 but is different from this in the structures of the cavity and the transmission amount suppressor, and the like.

The mold used in Example 8 is described using FIG. 14 to FIG. 17. FIG. 14 is a schematic perspective view of the mold used in Example 8, FIG. 15 is a schematic cross-sectional view of it, FIG. 16 is a schematic cross-sectional view of the transmission amount suppressor, and FIG. 17 is a photo showing that the transmission amount suppressor is fitted into the central part of the heating element and the cavity is formed inside the transmission amount suppressor.

As shown in FIG. 14 and FIG. 15, in a mold 60 used in Example 8, a heating element 64 has two parts and a transmission amount suppressor 66 is fitted into the inside thereof.

The heating element 64 is a rubber mold formed by the following process: Silicon carbide is incorporated in silicone as a dielectric property-imparting substance, and the mixture is kneaded and cured, and thereafter, the cured product is hollowed around its center so that the transmission amount suppressor 66 is fitted thereinto. In principle, all outer surfaces of the transmission amount suppressor 66 are in contact with inner surfaces of the rubber mold serving as the heating element 64.

The transmission amount suppressor 66 is according to an embodiment in which it has two parts as shown in FIG. 14 to FIG. 16, each has a rectangular main surface, and a space occurs inside when they are fitted with each other. The transmission amount suppressor 66 used in Example 8 is formed by processing an aluminum extrusion material (5052 material).

In the mold 60, a cavity 62 is present inside the transmission amount suppressor 66 in a closely attached state.

In the cavity 62 of the mold 60 as described above, a part of an internal space 68 for introducing the material is in contact with an inner surface of the transmission amount suppressor 66.

The cavity 62 was formed inside the transmission amount suppressor 66 using heat resistant liquid rubber made of silicone rubber.

In Example 8, two holes which connect the outside of the rubber mold to an outer surface of the transmission amount suppressor 66 set in its interior were formed in the rubber mold serving as the heating element 64. An alumina sheathed tube was inserted into one hole and a fiber optic thermometer was inserted into the sheathed tube so that the outer surface temperature of the transmission amount suppressor 66 could be continuously measured. The other hole was connected to a tube leading to a vacuum pump and the inside of the cavity 62 could be brought into a reduced pressure state by driving the vacuum pump. This hole corresponds to the vacuum hole 25 shown in FIG. 4.

The mold as described above was used to introduce a material into the internal space within the cavity.

Craft Alloy (manufactured by NISSIN RESIN Co., Ltd.) which is a low melting point alloy having a melting point of 150° C. and mainly containing tin and bismuth was used as the material.

The material in an amount of 20.5 g was charged into the cavity 62 and the transmission amount suppressor 66 was closed. Thereafter, the transmission amount suppressor 66 was fitted into the inside of the rubber mold serving as the heating element 64, the rubber mold was closed, and a heat resistant tape was applied to highly hermetically seal the rubber mold so that it may not open.

Thereafter, the fiber optic thermometer was inserted into the sheathed tube so that the outer surface temperature of the transmission amount suppressor 66 could be continuously measured. The tube leading to the vacuum pump was connected to the other hole formed in the rubber mold.

Then, the mold was set within the microwave molding apparatus and molding was performed by irradiating the mold with electromagnetic waves while evacuating with the vacuum pump so that the internal pressure of the rubber mold became −95 kPa.

The molding temperature during molding, the temperature elevation rate, and the retention time at the molding temperature were set to 150° C., 10° C./min, and 60 seconds, respectively. The molding temperature and the temperature elevation rate were adjusted while measuring with the fiber optic thermometer inserted into the sheathed tube.

After the completion of molding, the mold was taken out of the inside of the microwave molding apparatus and cooled for 1 hour by blowing air thereonto using the fan while continuing evacuation.

As a result, a molded body as shown in FIG. 18 could be obtained. During the fabrication process, sparks of the material did not occur.

The invention claimed is:

1. A molded body manufacturing method comprising:

irradiating at least a part of a mold with electromagnetic waves or setting the at least the part of the mold in an alternating electric field after a material is introduced into a cavity of the mold while keeping an inside of the cavity at a lower pressure than an atmospheric pressure;

melting or curing the material in the cavity to form a molded body;

keeping the inside of the cavity at the lower pressure than the atmospheric pressure until the molded body is in a cooled state; and taking the molded body out of the inside of the cavity after the molded body is in the cooled state, wherein, in the mold:

a heating element, which generates heat by absorbing the electromagnetic waves or generates heat by being set in the alternating electric field, is provided outside the cavity, wherein the heating element covers an entirety of the cavity, the heating element has a vacuum hole to which a vacuum pump is connected, and the vacuum pump is configured to make an inside of the heating element to be in a state having a pressure value that is lower than the atmospheric pressure; and a transmission amount suppressor, which suppresses an amount of transmission of the electromagnetic waves or the alternating electric field to the inside of the cavity, is provided, wherein at least a part of the cavity includes the transmission amount suppressor, the heating element generates the heat, and the heat is transmitted to the material, whereby molding is performed, and at least parts of outer surfaces of the cavity are in contact with inner surfaces of the heating element.

2. The molded body manufacturing method according to claim 1, wherein the transmission amount suppressor blocks out the transmission of the electromagnetic waves or the alternating electric field to the inside of the cavity.

3. The molded body manufacturing method according to claim 1, wherein the material contains, as a main component, at least one selected from the group consisting of a thermoplastic resin, a thermosetting resin, a low melting point metal, and a low melting point non-metal.

4. The molded body manufacturing method according to claim 1, wherein the material contains a fiber material and/or a filler.

5. The molded body manufacturing method according to claim 1, wherein the heating element contains silicone rubber and/or fluororubber, and further contains, as a dielectric property-imparting substance, at least one selected from the group consisting of silicon carbide, ferrite, barium titanate, carbon black, and graphite in an amount of 5 to 90 vol %.

6. The molded body manufacturing method according to claim 1, wherein the transmission amount suppressor contains metal and/or non-metal.

7. The molded body manufacturing method according to claim 6, wherein the metal and/or the non-metal is at least one selected from the group consisting of shielding glass, aluminum, iron, copper, and an alloy containing the aluminum, the iron, and/or the copper.

8. The molded body manufacturing method according to claim 1, wherein a wavelength region of the electromagnetic waves falls within a range of 0.78 μm to 100 m.

* * * * *